(12) United States Patent
Fisher

(10) Patent No.: US 8,517,003 B2
(45) Date of Patent: Aug. 27, 2013

(54) BALL THROWING DEVICE AND DISPLAY PACKAGE THEREFOR

(75) Inventor: Alexander Fisher, Cape Elizabeth, ME (US)

(73) Assignee: Planet Ventures, Inc., Portland, ME (US)

( * ) Notice: Subject to any disclaimer, the term of this patent is extended or adjusted under 35 U.S.C. 154(b) by 332 days.

(21) Appl. No.: 12/851,312

(22) Filed: Aug. 5, 2010

(65) Prior Publication Data

US 2012/0031385 A1   Feb. 9, 2012

(51) Int. Cl.
    *F41B 3/00*   (2006.01)

(52) U.S. Cl.
    USPC .............................................. 124/5

(58) Field of Classification Search
    USPC .............................................. 124/5
    See application file for complete search history.

(56) References Cited

U.S. PATENT DOCUMENTS

| | | | |
|---|---|---|---|
| 491,558 A | 2/1893 | Hill | |
| 651,222 A | 6/1900 | Wharton | |
| 851,195 A | 1/1907 | Sweetser | |
| 1,175,035 A * | 3/1916 | Wooster | 124/5 |
| 1,458,335 A | 6/1923 | Glinchikoff | |
| 1,535,029 A | 4/1924 | Murch | |
| D194,045 S | 11/1962 | Hasselbusch | |
| 3,428,036 A | 2/1969 | Parker | |
| 3,589,349 A | 6/1971 | Parker | |
| 3,797,472 A * | 3/1974 | Knisely, Jr. | 124/5 |
| 3,841,292 A | 10/1974 | Hoffman | |
| 4,247,003 A | 1/1981 | Jones | |
| 4,364,371 A * | 12/1982 | Woolard | 124/5 |
| 4,527,801 A | 7/1985 | Lambert | |
| 5,129,650 A | 7/1992 | Hayman | |
| D363,960 S | 11/1995 | Choi | |
| 5,477,964 A | 12/1995 | Hart | |
| 6,076,829 A | 6/2000 | Oblack | |
| 7,032,583 B1 | 4/2006 | Hall | |
| 7,128,556 B2 | 10/2006 | Wessells et al. | |
| 7,520,818 B2 | 4/2009 | Winchester | |
| 7,624,865 B2 | 12/2009 | Pendergraph et al. | |
| 7,677,994 B2 | 3/2010 | Matsumoto et al. | |
| 7,686,001 B2 | 3/2010 | Fitt | |
| 2006/0229136 A1 | 10/2006 | Presley | |
| 2009/0223852 A1 | 9/2009 | Konop et al. | |
| 2012/0006309 A1 * | 1/2012 | Levin et al. | 124/5 |

* cited by examiner

*Primary Examiner* — John Ricci
(74) *Attorney, Agent, or Firm* — Preti Flaherty Beliveau & Pachios LLP

(57) ABSTRACT

A ball throwing device includes a shaft having first and second ends and a ball holder formed on the first end of the shaft. The ball holder has first and second U-shaped pieces that define four curved finger elements and are arranged perpendicular to one another. In one embodiment, the shaft and the ball holder are made of bamboo. A cork handle is formed on the second end of the shaft. The ball throwing device can be combined with a hang card to form a display package. The hang card has a mounting aperture formed therein through which the shaft extends so that the ball holder abuts the hang card.

10 Claims, 5 Drawing Sheets

BALL THROWING DEVICE AND DISPLAY PACKAGE THEREFOR

BACKGROUND OF THE INVENTION

This invention relates generally to ball throwing devices, and more particularly to devices for tossing a ball for playing fetch with a dog or other animal.

It is well know that many dogs love playing fetch. This has traditionally meant the dog owner must repeatedly throw a ball or stick that the dog then retrieves for yet another throw. Quite often, the person throwing the object tires out before the dog does. Also, the thrown object often becomes saturated with the dog's saliva, making handling the object by hand unpleasant.

To overcome these difficulties, various ball throwing devices have been proposed that facilitate throwing balls for dogs to fetch. Such devices generally comprise an elongated handle having a cup or similar structure formed on one end for holding the ball. A person can insert the ball into the cup and swing the device in a forward motion, thereby propelling the ball a good distance. This enables the thrower to repeatedly throw the ball without suffering arm fatigue. The device also eliminates the need to manually handle wet balls.

Conventional ball throwing devices are typically made of plastic materials. While ball throwing devices made of a plastic material are generally suitable, they tend to lack durability and a high-quality appearance.

SUMMARY OF THE INVENTION

The present invention relates to a ball throwing device including a shaft having first and second ends and a ball holder formed on the first end of the shaft. The ball holder has first and second U-shaped pieces that define four curved finger elements and are arranged perpendicular to one another. In one embodiment, the shaft and the ball holder are made of bamboo. A cork handle is formed on the second end of the shaft. The ball throwing device can be combined with a hang card to form a display package. The hang card has a mounting aperture formed therein through which the shaft extends so that the ball holder abuts the hang card.

DETAILED DESCRIPTION OF THE INVENTION

Figure 1:
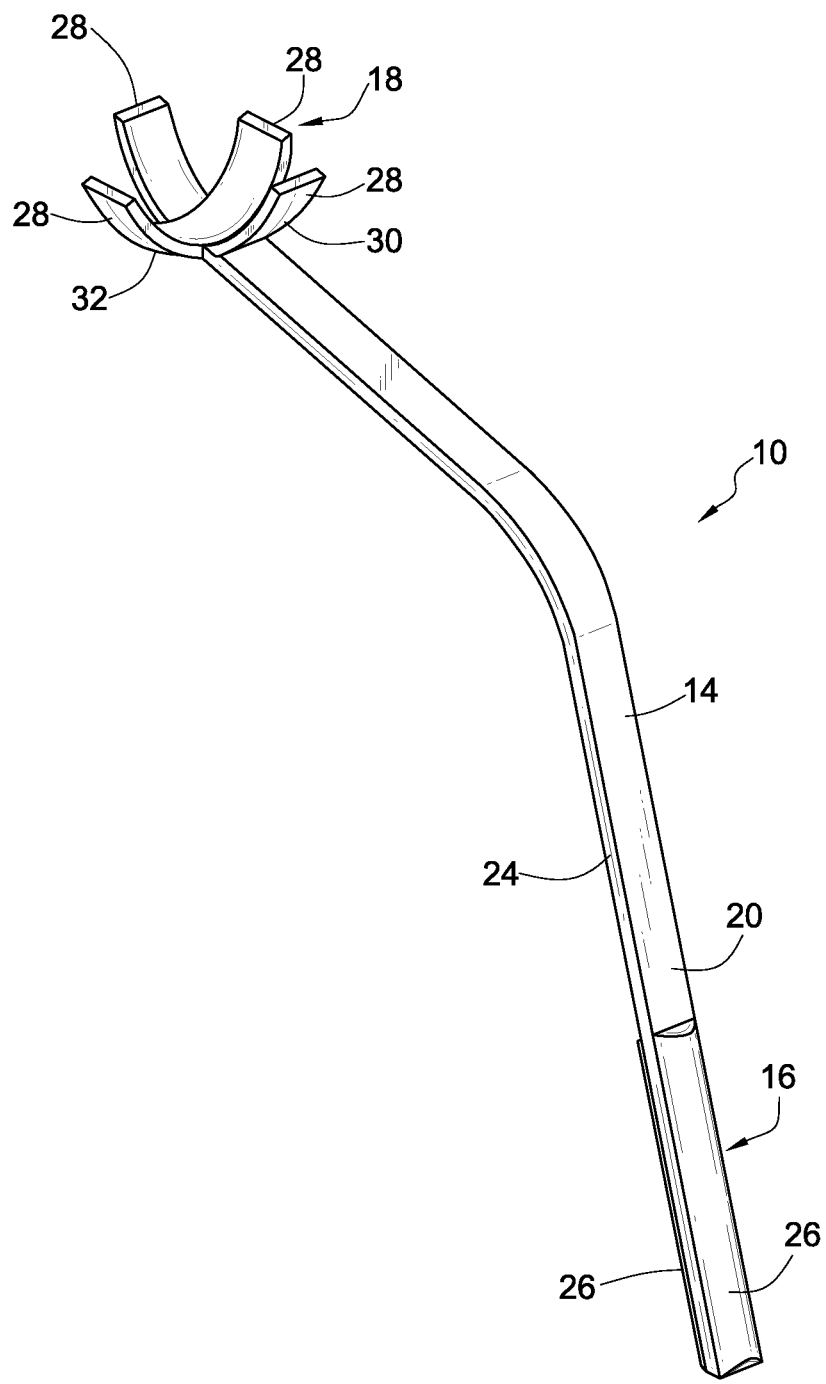
FIG. 1 is a perspective view of one embodiment of a ball throwing device.
Figure 2:
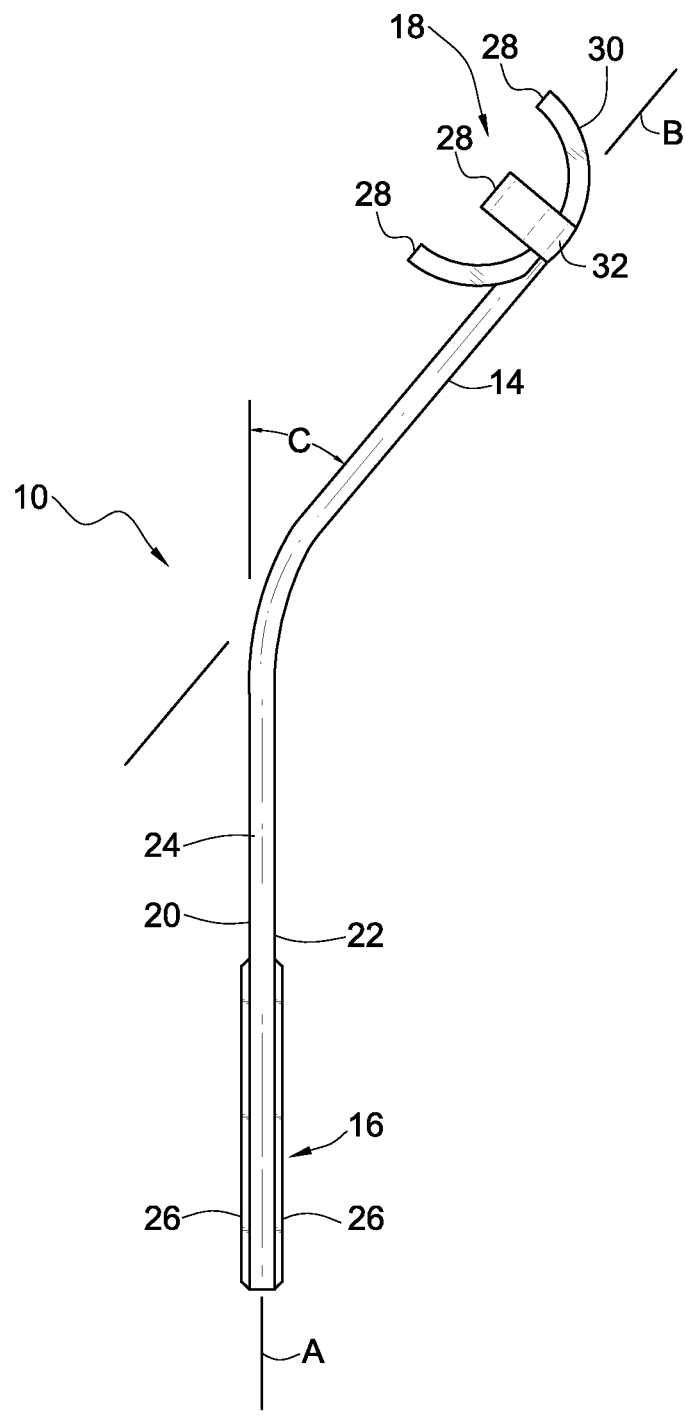
FIG. 2 is a side view of the ball throwing device.

Referring to the drawings wherein identical reference numerals denote the same elements throughout the various views, FIGS. 1 and 2 show one embodiment of a ball throwing device 10 comprising an elongated shaft 14 having a handle 16 formed on one end thereof and a ball holder 18 formed on the other end. In one embodiment, the shaft 14 and the ball holder 18 are made of bamboo. Bamboo, which is well known for its beauty and durability, is a particularly suitable material for the ball throwing device 10 because it is sufficiently strong and yet relatively lightweight. Bamboo is also recognized as being an environmentally-friendly material because bamboo plants grow quickly and generally require little or no irrigation, fertilization or pesticides.

The shaft 14 is preferably made of laminated bamboo. For instance, the shaft 14 can comprise four laminations that form a single piece of material that is long and slender and rectangular in cross-section so as to define a forward surface 20, a rear surface 22 and two side edges 24. The shaft 14 is curved along its length such that the ball holder 18 is offset with respect to the handle 16. Specifically, the ball holder 18 is positioned behind the axis A defined by the shaft 14 at the handle 16. In the illustrated embodiment, the curvature of the shaft 14 is such that the axis A defined by the shaft 14 at the handle end forms an angle C that is approximately 40 degrees relative to the axis B defined by the shaft 14 at the ball holder end.

The handle 16 comprises a first grip member 26 attached to the forward surface 20 of the shaft 14 adjacent the handle end and a second grip member 26 attached to the rear surface 22. The grip members 26 can be made of cork, preferably from recycled cork scraps. The handle 16 is sized so as to be easily gripped by hand.

The ball holder 18 comprises four curved finger elements 28 arranged to releasably hold a ball. The finger elements 28 are arranged in two opposing pairs that are spaced apart a sufficient distance so that the ball is held snugly therein and will not fall out but will be released and propelled forward when the ball throwing device 10 is swung forward. The ball holder 18 can be sized to hold a standard tennis ball or any other sized ball. In the illustrated embodiment, the four-finger configuration of the ball holder 18 is accomplished by providing first and second U-shaped pieces 30, 32 arranged in an overlapping manner, perpendicular to one another. The first U-shaped piece 30 defines the first and second curved finger elements 28 and is attached to the shaft 14 so as to be aligned with (i.e., parallel to) the axis B and thus the shaft 14. The second U-shaped piece 32 defines the third and fourth finger elements 28 and is attached to the shaft 14 so as to be perpendicular to the axis B. The two U-shaped pieces 30, 32, like the shaft 14, are preferably made of laminated bamboo.

To use the ball throwing device 10, a ball is placed into the ball holder 18. The user then grasps the handle 16 and swings the ball throwing device 10 forward with sufficient force to cause the ball to be released from the ball holder 18 and propelled in the direction the ball throwing device 10 has been swung. The ball throwing device 10 can also be used to pick up a ball off the ground by holding the handle 16 and pressing the ball holder 18 against the ball so as to force the ball into the ball holder 18.

Figure 3:
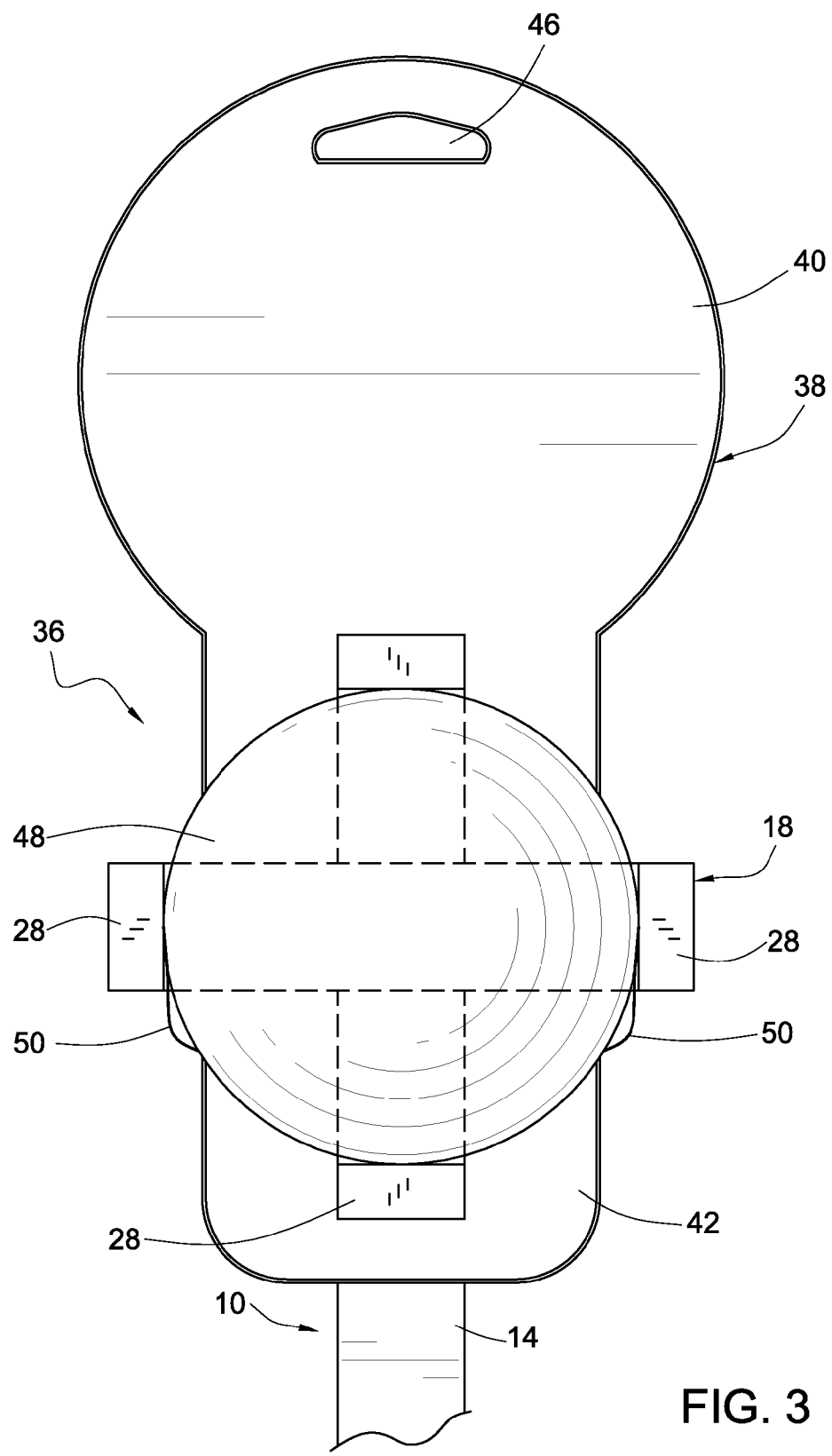
FIG. 3 is a front view of a display package for a ball throwing device.
Figure 4:
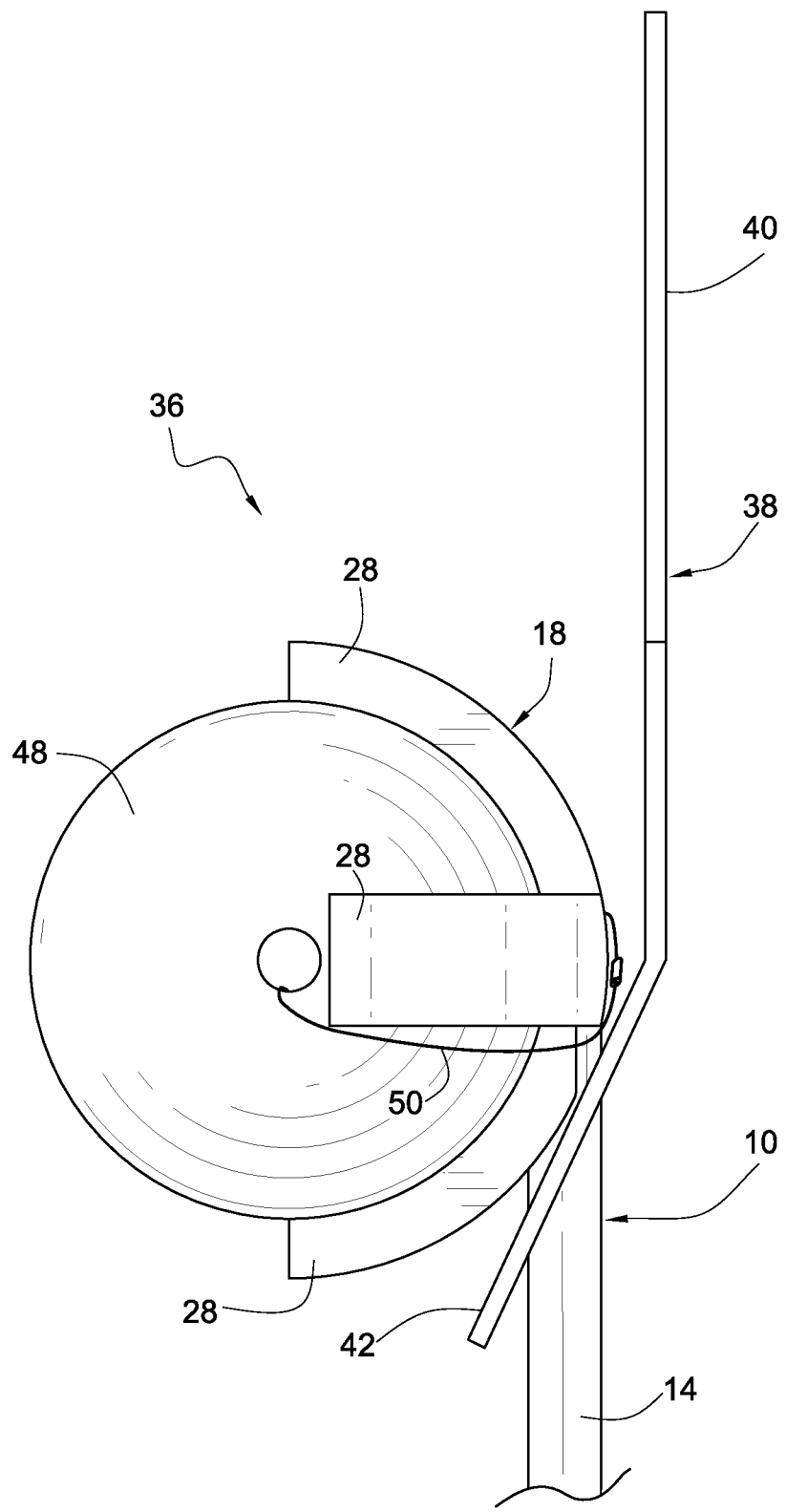
FIG. 4 is a side view of the display package for a ball throwing device.
Figure 5:
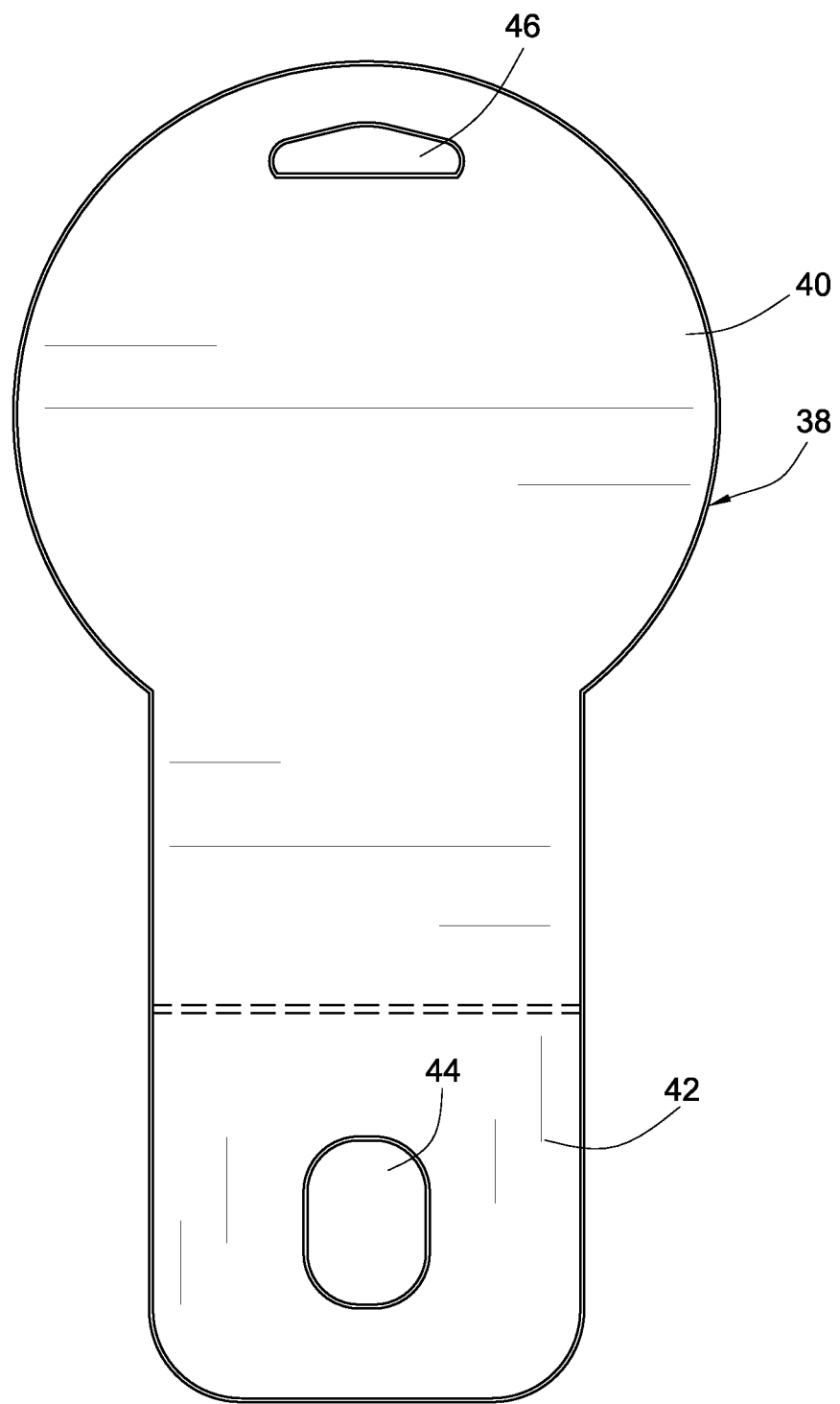
FIG. 5 is a front view of a hang card from the display package for a ball throwing device.

Turning to FIGS. 3 and 4, a display package 36 for packaging and displaying a ball throwing device 10 is shown. This display package 36 includes a hang tag or card 38 that comprises an upper portion 40 and a lower portion 42. In the illustrated embodiment, the lower portion 42 is generally rectangular in shape while the upper portion 40 is generally circular and wider than the lower portion 42. A mounting aperture 44 (FIG. 5) is formed centrally in the lower portion 42. The mounting aperture 44 is large enough to allow the shaft 14 and the handle 16 to fit through, but the ball holder 18 is larger than the mounting aperture 44 and thus does not fit through. That is, the mounting aperture 44 has dimensions that are slightly larger than the shaft 14 and the handle 16 but smaller than the ball holder 18. Consequently, the ball throwing device 10 is mounted to the hang card 38 by sliding the handle 16 through the mounting aperture 44 such that the shaft 14 extends through the mounting aperture 44 with the ball holder 18 abutting the front side of the hang card 38 adjacent to the mounting aperture 44.

The hang card 38 further comprises a hanging aperture 46 formed in the upper portion 40 adjacent to the top edge of the hang card 38. This allows the display package 36 to be hung from a hook or the like and displayed in a retail store. The hang card 38 can have indicia printed on the front and/or rear sides thereof. Such indicia can include logos, brand names and other identifying information. The indicia can also include information about how to use the ball throwing device, information about the construction of the ball throwing device, information about the company that produces the ball throwing device, etc.

The display package 36 can further include a ball 48 that can be used with the ball throwing device 10. The ball 48 is inserted into the ball holder 18 of the ball throwing device 10. A retainer can be provided to retain the ball 48 in the ball holder 18. In the illustrated embodiment, the retainer is a cord 50, such as a nylon cord, looped through the ball 48 and behind the ball throwing device 10 to hold the ball 48 in place.

While specific embodiments of the present invention have been described, it should be noted that various modifications thereto can be made without departing from the spirit and scope of the invention as defined in the appended claims.

What is claimed is:

1. A ball throwing device comprising:
    a shaft having first and second ends; and
    a ball holder formed on said first end of said shaft, said ball holder comprising first and second U-shaped pieces arranged perpendicular to one another so as to define four curved finger elements, the first U-shaped piece arranged parallel to said shaft and defining two of said curved finger elements, and the second U-shaped piece arranged perpendicular to said first U-shaped piece and defining the other two of said curved finger elements.

2. The ball throwing device of claim 1 wherein said shaft and said ball holder are made of bamboo.

3. The ball throwing device of claim 2 wherein said shaft and said ball holder comprise laminated bamboo.

4. The ball throwing device of claim 1 further comprising a cork handle formed on said second end.

5. The ball throwing device of claim 4 wherein said handle comprises first and second grip members attached to opposing surfaces of said shaft.

6. The ball throwing device of claim 5 wherein said first and second grip members are made of recycled cork scraps.

7. A ball throwing device comprising:
    a bamboo shaft having first and second ends;
    a bamboo ball holder formed on said first end of said shaft, said ball holder comprising four curved finger elements, the ball holder further comprising a first U-shaped piece arranged parallel to said shaft and defining two of said curved finger elements and a second U-shaped piece arranged perpendicular to said first U-shaped piece and defining the other two of said curved finger elements; and
    a cork handle formed on said second end of said shaft.

8. The ball throwing device of claim 7 wherein said shaft is rectangular in cross-section and has a forward surface and an opposing rear surface.

9. The ball throwing device of claim 8 wherein said handle comprises a first grip member attached to said forward surface and a second grip member attached to said rear surface.

10. The ball throwing device of claim 9 wherein said first and second grip members are made of recycled cork scraps.

* * * * *